Oct. 15, 1957
J. G. MEJEAN
2,810,036
APPARATUS FOR INDICATING OR CONTROLLING THE LEVEL OF LIQUIDS
Filed July 11, 1955
3 Sheets-Sheet 1
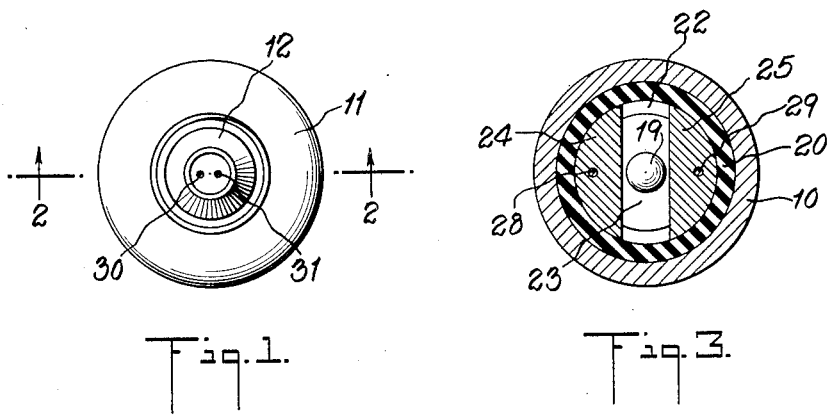
Fig.1.
Fig.3.
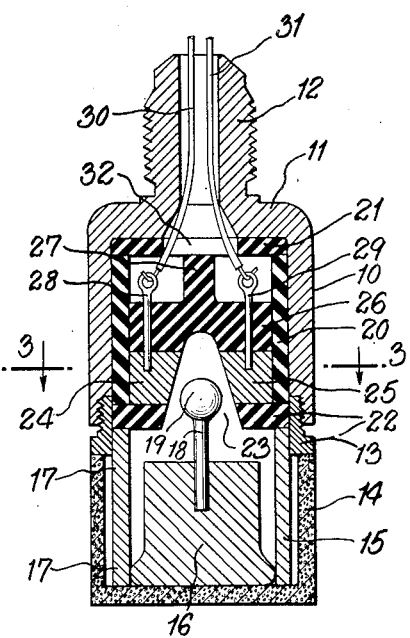
Fig.2.
INVENTOR.
JACQUES G. MEJEAN
BY
Benj. T. Rauber
ATTORNEY Oct. 15, 1957  J. G. MEJEAN  2,810,036
APPARATUS FOR INDICATING OR CONTROLLING THE LEVEL OF LIQUIDS
Filed July 11, 1955  3 Sheets-Sheet 2
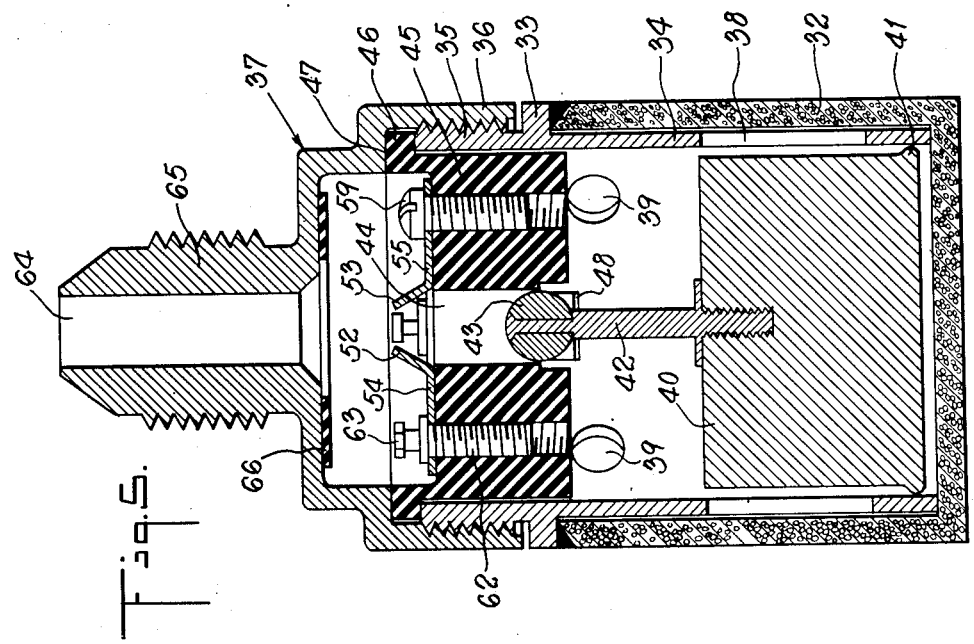
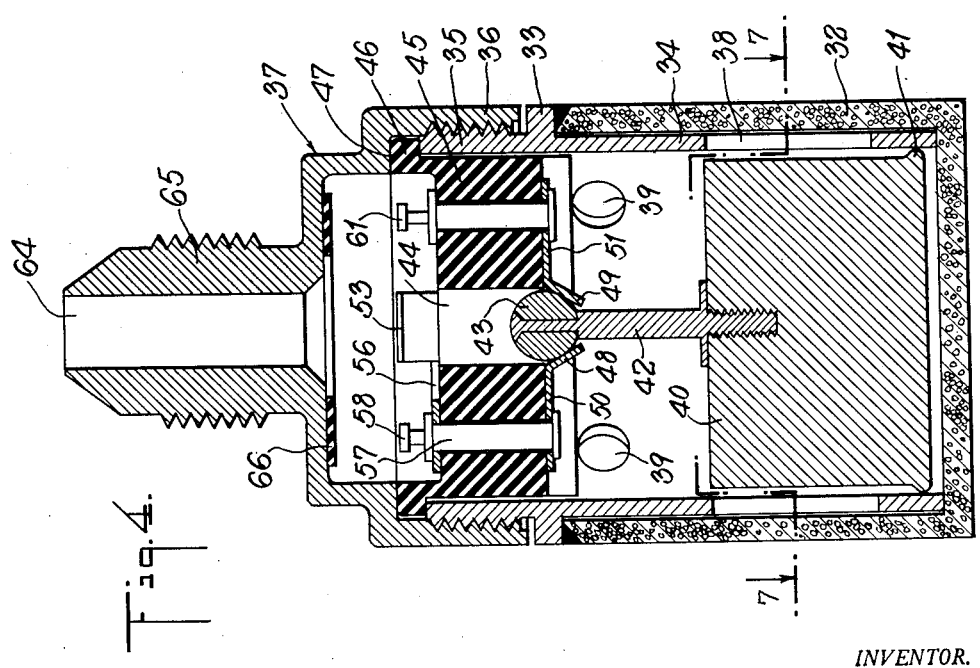
INVENTOR.
JACQUES G. MEJEAN
BY
ATTORNEY

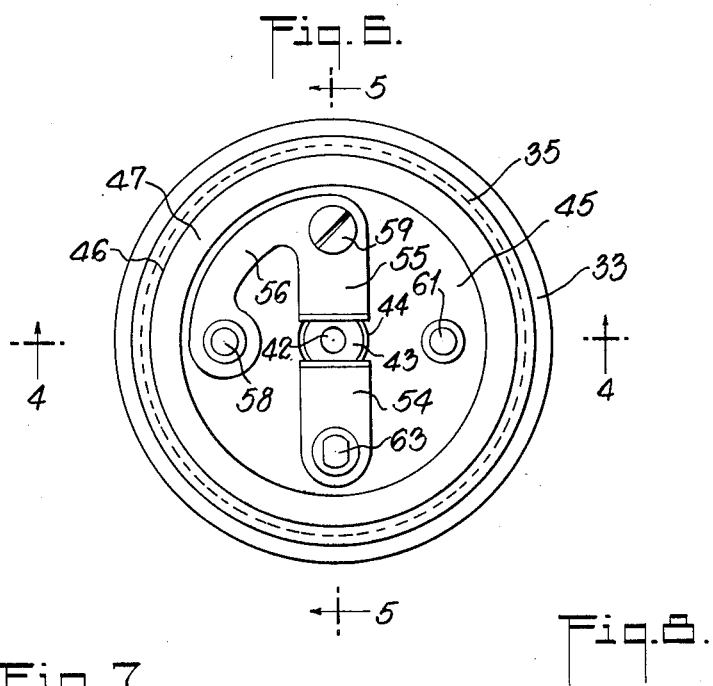
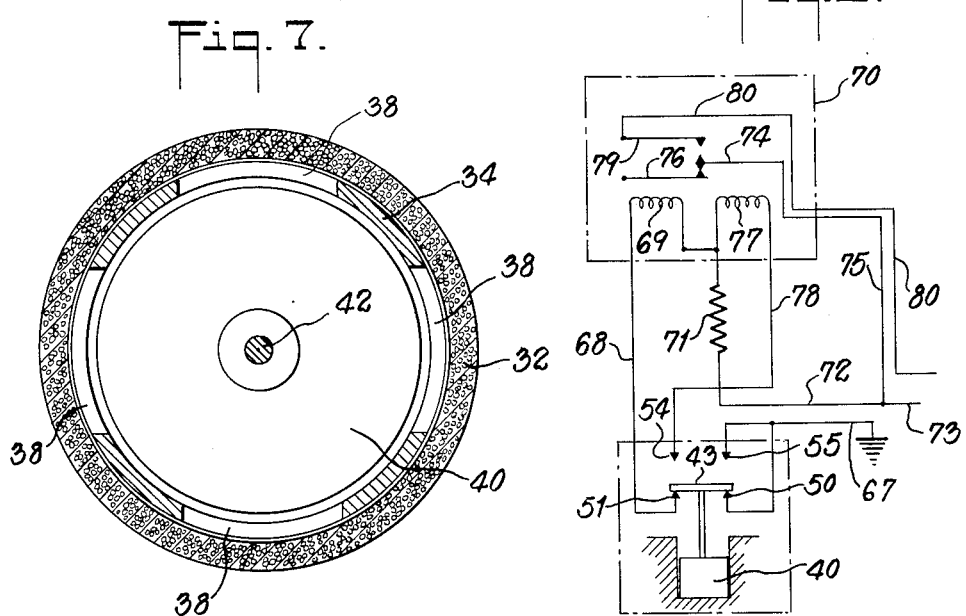

United States Patent Office 2,810,036
Patented Oct. 15, 1957

2,810,036

APPARATUS FOR INDICATING OR CONTROLLING THE LEVEL OF LIQUIDS

Jacques G. Mejean, Greenwich, Conn., assignor to The Aerotec Corporation, Greenwich, Conn., a corporation of Connecticut Application July 11, 1955, Serial No. 521,004

11 Claims. (Cl. 200—84)

My invention relates to apparatus for indicating or controlling the level of a liquid in a tank or container such as a fuel tank, particularly to indicate when the liquid level rises or falls to a predetermined level.

For this purpose float switches have been used within the tank or container to open or close an electric circuit having an indicator or control mechanism. Such float switches exposed to the movement of the liquid in the tank, particularly in the fuel tank of an aircraft, are subject to the tossing of the liquid fuel as it sloshes about when the aircraft is in flight and to vibratory movements caused by said tossing or by wave motion and consequently may give unreliable, false or erratic indications of the fuel level. To avoid these disadvantages, other devices have been suggested as, for example, those depending on a change in conductivity of a heated conductor due to loss of heat as it is wet by the liquid fuel or those depending on the refractive relations of a crystal prism and the surrounding medium as it is immersed in the rising liquid or as the liquid level falls below it. These expedients are also subject to error and erratic action due not only to the tossing of the liquid but also to spray or foam which may form to a greater or less thickness on the surface of the liquid. Foam or spray would have an action on apparatus depending on thermal loss or on a solid-fluid interface for level indication similar to that of the body of the fuel itself and would thus interfere with the functioning of such apparatus.

My invention provides an indicating mechanism which avoids or obviates the influence of tossing, bobbing and foaming and is therefore free from the above influences. Moreover it is usable in any position. The indicating mechanism of my invention is moreover free from the danger of causing an explosion in the tank due to a spark in the electric control or indicating circuit.

In my invention the working elements as, for example, a float and switch contacts are enclosed in a housing of which the wall or a part thereof has a fine, porous metal structure that permits liquids and gases to enter and leave but which prevents sudden entrance or exit of the liquid and gas and prevents the entrance of foam or spray. The porous metal has small tortuous passages so that it may filter out particles having a largest dimension of a few thousandths of an inch, for example, of a fineness to filter out particles of a largest diameter of from 0.002 inch to 0.005 inch or of a smaller fineness to filter out particles having a largest dimension of 0.0005 inch. Liquid can flow through the pores freely and with sufficient rapidity so that the level inside the housing is substantially the same as the true level in the tank but not with sufficient rapidity as to rise and fall with the tossing or sloshing about of the fuel. Vibratory or wave motion in the tank is not transmitted through the porous wall of the housing. Spray or foam also can not pass as such through the porous wall. In the event of an explosion occurring within the housing due to the breaking of an electric circuit, or from other cause, it is not transmitted through the porous wall. Moreover suspended particles and water are not transmitted.

The porous wall may be of any suitable construction and material. A construction suited for this purpose is one made by sintering together small spherical particles of a suitable metal, such as stainless steel, brass, bronze, or other alloy, and of a diameter to give a uniform porosity of the required pore size. Suitable porous walls have also been produced from mesh materials. A wall of this type having a thickness of about $\frac{1}{16}$ inch is satisfactory.

The housing may be used to enclose various types of control mechanisms. It is particularly suited for float controlled switches in which the float and an electric make and break switch are both housed in the housing.

The porous metal structure may form any desired part of the housing. Preferably it is in the form of a cup which is sealed and secured air tightly to the upper part of the housing and thus forms a lower compartment in which the float is contained. The float may be guided in any suitable guide within the porous walled compartment as, for example, by an encircling cylinder open at its upper and lower ends to permit the entry and exit of liquids and gases. The bridging contact of the electric circuit is mounted on the top or upper end of the float and preferably comprises a vertical stem with a bridging ball at its upper end.

The contact terminals are mounted in suitable insulation above the float and have a gap flaring away from the bridging terminal. Leads extend from the terminals through the insulation to an outlet in the upper part of the housing which is secured fluid tightly to the wall of the tank or to a fitting therein.

The various features of my invention as applied to a float controlled switch are illustrated by way of example in the accompanying drawings in which, Fig. 1 is a plan view of a float switch embodying a form of the invention, Fig. 2 is a vertical section of the float switch shown in Fig. 1, Fig. 3 is a section taken on line 3—3 of Fig. 2, Fig. 4 is a section similar to that of Fig. 2 of another embodiment of the invention, Fig. 5 is a section taken on a plane at a right angle to that of Fig. 4, Fig. 6 is a plan view of the embodiment of Fig. 4 with the cover removed, Fig. 7 is a horizontal section taken on the line 7—7 of Fig. 4, and Fig. 8 is a wiring diagram of a circuit embodying the invention.

In the embodiment illustrated in Figs. 1, 2 and 3 the housing of the switch comprises an upper cylindrical part 10 having a top or shoulder 11 from which extends a nipple 12 threaded on its outer surface so that it may be screwed into an opening or fitting of the tank. The lower end of the part 10 is threaded internally to receive a threaded ring 13 to the lower edge of which is autogenously secured, as by welding, the upper edge of a cup 14 of porous metal of the type described above. This assembly forms a complete enclosure through which liquids and gases from the tank may enter and leave only through the wall of the porous cup 14.

Within the cup 14 is a cylindrical guide 15 within which may slide vertically a float 16 enlarged at its lower end to contact the inner surface of the guide cylinder. The guide cylinder 15 may be provided with suitable spaces or passages such as indicated at 17 to permit free passage of liquid and fluid from within to outside the guide and thus prevent pocketing of air or vapors. Set into the top of the float 16 is a stem 18 having an enlarged or ball shaped upper end 19 of conductive metal to serve as a bridging contact.

The wall of the upper cylindrical part 10 is provided with a lining of cylindrical shape 20 contacting at its upper end a flat disc 21 of insulating material placed against the inner surface of the top or shoulder 11. The lower end of the cylinder 20 rests on an insulating disc 22 which, in turn, rests on the upper edge of the guide cylinder 15. The guide cylinder 15 is thus held in place by contact with the inner surface of the ring 13 and the under surface of the disc 22.

The disc 22 is provided with a central slot or opening 23 into which the upper end of the stem 18 and ball 19 project. Above and resting on the disc 22 are a pair of spaced electric terminals 24 and 25, the space between these contacts being above the opening 23. The opposed faces of the terminals 24 and 25 and of the opening 23 are flared outwardly so that they receive the ball 19 as the float 16 rises and so that the ball makes a tight sliding contact with the terminals. On the upper surfaces of the terminals is a disc of insulating material 26 having an upright flange 27 extending to the lower face of the disc 21 to hold the disc in position.

Extending from the terminals 24 and 25 are leads 28 and 29 passing through and sealed in the disc 26 to which may be secured the ends of lead wires 30 and 31 which enter through the nipple 12 and through an opening 32 in the disc 26. The lead wires 30 and 31 are passed through the nipple when the cup 14 is unscrewed and removed from the upper part 10 and the disc 22, terminals 24 and 25 and the disc 26 are removed from the part. After attaching the lead wires, the various elements may be arranged in place and the cup 14 screwed air tightly to the upper cylindrical part 10.

In use the nipple 12 is screwed into an opening in the tank or into a fitting leading to the exterior. The switch elements are thus enclosed in metal so that in event of a spark within the housing, as may happen upon breaking the circuit or bridge between the terminals 24 and 25, and possible ignition and explosion of a mixture of fuel vapor and air within the housing this explosion will be confined to the housing and not be transmitted to the interior of the tank. The dampening of any tossing or wave motion of the tank contents through the porous metal cup 14 also insures against tossing the float and the ball 19 into contact with the terminals 24 and 25 and results in a smooth, reliable, operation of the switch. It will be understood that upon bridging the terminals 24 and 25 an electric circuit will be closed through an indicator or alarm to indicate the rising of the fuel level to the upper limit for which the switch is set. Or the switch may be used to operate an indicator or alarm upon breaking the circuit when the fuel level in the tank reaches a lower level. The electric circuit may be used to set in motion an automatic apparatus of any desired type.

In the embodiment of Figs. 4 to 7, inclusive, a cup 32 of porous metal is welded or otherwise joined integrally to a flange 33 of a metal cylinder having a float guiding extension 34 downwardly from the flange and an externally threaded extension 35 upwardly from the flange to screw into an internally screw threaded cylindrical wall 36 of a top or cover 37. The guide cylinder extension 34 is open at its lower end and has openings 38 and above them openings 39 to permit the free flow of liquid and gas to and from the interior of the cylinder. A float 40 is slidable vertically within the cylinder 34 from the position shown in full lines to the position shown in broken lines and is guided by a bead 41 extending circumferentially at the lower edge of the float into sliding contact with the inner surface of the cylinder.

Secured in and extending vertically upwardly from the float 40 is a stem 42 carrying at its upper end a contact bridging ball 43, preferably of silver. As the ball 43 rises and falls it travels through and is guided in a cylindrical passage 44 in a block 45 of electric insulating material. The block 45 is held in position in the cylindrical extension 35 by a flange 46 extending upwardly and outwardly into a recess formed between the upper edge of the extension 35 and a shoulder 47 on the lower face of the top 37.

In its lowermost position the ball 43 rests on and bridges a pair of diametrically opposite, downwardly converging extensions 48 and 49 of a pair of terminal plates 50 and 51, respectively, secured to the under surface of the insulating block 45. In its uppermost position the ball 43 presses upwardly against a pair of diametrically opposite, upwardly converging extensions 52 and 53 of a pair of terminal plates 54 and 55, respectively, secured to the upper face of the block 45, Fig. 5.

The contact plates 50, 51, 54 and 55 may be secured in any suitable manner to the insulating block 45 and may be provided with suitable connectors to the leads of a control circuit. In the embodiment illustrated, the terminal or contact plates 50 and 55 are to be grounded and accordingly the plate 55 is provided with an arcuate extension 56 over the upper surface of the block 45 terminating above the end of the terminal plate 50 and secured thereto by a rivet 57 extending through the plate 50 and extension 56 and the block 45 and having a common soldering head 58 to which the end of a lead may be soldered. A fillister head screw 59 positioned as shown in Fig. 6 serves to secure the plate 55 additionally to the block 45. The plate 51 is secured to the under surface of the block 45 by means of a rivet 60 extending upwardly through the block and terminating in a projecting solder head 61. The plate 54 is secured to the upper face of the block by a screw 62 having a solder head 63.

In connecting the terminals in the circuit, the top 37 is removed from the cylindrical extension 35, and from the cup 32, and the ends of the leads, in the embodiment shown three in number, are passed through a passage 64 in an externally threaded neck 65 extending upwardly from the top and below an annular insulating plate 66 adjacent the upper inner surface of the top. The ends of the leads are then soldered to their respective terminals 58, 61 and 63 and the top screwed back onto the extension 35.

The float switch assembly may then be mounted in the tank either in the upright position shown in Figs. 4 and 5 by screwing the neck 65 into the top of the tank or into a fitting at the top or inverted position by screwing the neck 65 into the bottom of the tank or into a fitting near the bottom. In the former mounting the float will indicate when a filling level is reached and in the latter it will indicate when a low or emptying level is reached.

The float switch of Figs. 4 to 7 may be incorporated in an electric warning or instrument operating circuit as indicated by way of example in the wiring diagram of Fig. 8. In this system the terminals 50 and 55 are grounded by a common grounding lead 67. The lower terminal 51 is connected through a branch lead 68, a solenoid 69 in a relay 70, a resistance 71 and lead 72 to a power line 73. The solenoid 69 serves merely to hold a switch arm 74 connected to the power line 73 through a branch lead 75 to a dead end terminal 76 and thus prevent it from being vibrated or thrown into contact with and to close any other circuit.

When the bridging member 43 is lifted from the contacts 50 and 51 and brought to a position to bridge the contacts 54 and 55 a circuit is closed from the power line 73 and lead 72 and resistance 71 to a solenoid 77 and thence through a lead 78 to the terminal 54 bridging member 43 and contact 55 to ground. Energizing the solenoid 77 serves to bring the switch 74 into contact with a terminal 79 of a lead 80 leading to the alarm or operating system. It is to be understood that when the float valve is inverted the connections 51 and 54 may remain as shown in Fig. 8 as the alarm or operating system is to be operated when the liquid level falls and the contacts 54 and 55 are bridged by the falling, inverted, float.

The relay is of the latch-in type so that it requires a full excursion of the bridge from the lower set of contacts to the upper set of contacts in order to energize the relay. This construction renders the control extremely stable even when high vibration or high acceleration are encountered as is the case on aircraft.

The wiring is such that as soon as one impulse goes through one of the pairs of contacts, the relay is energized, transfers and no more current flows through said pair of contacts.

It will be apparent that the movement of fluids and gases or vapors into and out of the housing is very slightly retarded so that temporary or passing changes in the liquid level in the immediate vicinity of the housing are damped out and that only the true or average level of liquid in the tank is present in the housing. The dimensions of the interior of the housing are so small and restricted that there is no wave motion, foam, spray, or tossing to affect the operation of any elements housed therein. The interior of the housing is also isolated against the passage of solid particles, water or flame through the wall of the housing.

What I claim is:

1. Liquid level indicating apparatus which comprises an element influenced by immersion in and emersion from a liquid to operate a level responsive mechanism and a housing enclosing said element and having a porous metal wall portion having fine tortuous passages for retarded entrance and exit of liquids and gaseous media to and from the interior of said housing, the pores of said metal wall being of a fineness to filter out particles of a largest dimension not above about 0.005 inch.

2. The apparatus of claim 1 in which said level responsive mechanism comprises an electric circuit.

3. The apparatus of claim 1 in which said element comprises a float operated switch and a float actuated by the liquid level in said housing.

4. The apparatus of claim 1 in which said element comprises an insulating block having spaced contact terminals secured therein and a float having a bridging contact to contact and bridge said terminals.

5. The apparatus of claim 1 in which said element comprises an insulating block having two pairs of spaced insulated contacts and a bridging contact and float to move said bridging contact from one pair of insulated contacts to the other alternatively as said float rises and falls.

6. A float switch which comprises a housing having a body of electrical insulating material in said housing spaced from the lower part thereof to form a float compartment, said housing having a wall portion of porous metal having fine tortuous passages for the retarded passage of liquids and gaseous media into and out of said compartment, the pores of said porous metal being of a fineness to filter out particles of a largest dimension not above about 0.005 inch, a pair of spaced electric terminals below said body of insulating material and having leads extending through said body of insulating material and a float in said float compartment having a bridging contact to bridge said terminals when said float rises.

7. The float switch of claim 6 having a cylindrical guide for said float.

8. The float switch of claim 6 in which the wall of said float compartment comprises a cup of porous metal.

9. The float switch of claim 8 having a ring to which the upper part of said cup is autogenously secured and which is threaded into the wall of the upper part of said housing.

10. The float switch of claim 6 in which the upper part of said housing has an opening for conductors to the leads of said terminals.

11. A float switch which comprises a housing having a body of electric insulating material in the upper part of said housing and a float compartment in the lower part threof, said housing having a wall portion of porous metal having fine tortuous passages for the retarded passage of liquid and gaseous media to and from the interior of said compartment, the pores of said metal wall being of a fineness to filter out particles of a largest dimension not above about 0.005 inch, an electric terminal below and having a lead extending through said body of insulating material, and a float in said float compartment having a contact to contact said terminal when said float rises.

References Cited in the file of this patent

UNITED STATES PATENTS

| | | |
|---|---|---|
| 1,253,324 | Windridge | Jan. 15, 1918 |
| 1,323,113 | Sprangers | Nov. 25, 1919 |
| 1,348,015 | Lee | July 27, 1920 |
| 1,744,289 | Walters | Jan. 21, 1930 |
| 2,103,941 | Franey | Dec. 28, 1937 |
| 2,278,279 | Morris | Mar. 31, 1942 |
| 2,479,503 | Moore | Aug. 16, 1949 |
| 2,613,294 | McNea | Oct. 7, 1952 |
| 2,661,411 | Berger | Dec. 1, 1953 |
| 2,663,772 | Cochrane | Dec. 22, 1953 |
| 2,749,401 | Castner | June 5, 1956 |